(12) United States Patent
Liao

(10) Patent No.: US 6,296,369 B1
(45) Date of Patent: Oct. 2, 2001

(54) LAMP

(76) Inventor: Jin-Po Liao, No. 3, Lane 121, Chien-Hsing Rd., Taya Hsiang, Taichung Hsien (TW)

(*) Notice: Subject to any disclaimer, the term of this patent is extended or adjusted under 35 U.S.C. 154(b) by 0 days.

(21) Appl. No.: 09/577,263

(22) Filed: May 10, 2000

(51) Int. Cl.[7] .................................................. F21L 7/00
(52) U.S. Cl. ........................... 362/186; 362/363; 362/399
(58) Field of Search ................................... 362/186, 197, 362/198, 199, 363, 37.1, 399, 190, 191

(56) References Cited

U.S. PATENT DOCUMENTS

| | | | | |
|---|---|---|---|---|
| 2,156,742 | * | 5/1939 | Shellabarger | 362/186 |
| 2,492,837 | * | 12/1949 | Briggs | 362/186 |
| 2,753,442 | * | 7/1956 | Wiswell | 362/186 |
| 4,388,674 | * | 6/1983 | Sano | 362/186 |

FOREIGN PATENT DOCUMENTS

| | | | |
|---|---|---|---|
| 29309 | * | 12/1912 (GB) | 362/186 |
| 218841 | * | 7/1921 (GB) | 362/186 |

* cited by examiner

*Primary Examiner*—Sandra O'Shea
*Assistant Examiner*—Peggy L Neils
(74) *Attorney, Agent, or Firm*—Alan Kamrath; Rider, Bennett, Egan & Arundel, LLP

(57) ABSTRACT

A lamp includes a bowl-like base having a bottom and wall extending up from said bottom. A storage battery is mounted on the bottom of the base and two retaining plates extend up from opposite ends of the bottom of the base within the wall. The retaining plate includes a free end having a button mounted thereon. The button partially extends through the wall of the base. A hook is attached to the button and has a free end over the wall of the base. A printed circuit board is mounted on one of the retaining plates and is connected to the storage battery. A reflector is mounted on the base. A socket is mounted at the center of the reflector, and a bulb is received in the socket. The reflector and the bulb are connected to the storage battery. The open end of the globe having an edge corresponding to the wall of the base and abutting an edge of the wall to form a chamber. The side of the globe is translucent, and the top is transparent.

12 Claims, 4 Drawing Sheets

LAMP

BACKGROUND OF THE INVENTION

1. Field of the Invention

The present invention relates to a lamp, and more particularly to a lamp that can be either a normal light source or an emergency light source when electricity is interrupted.

2. Description of Related Art

A conventional emergency lamp in accordance with the prior art used in case of loss of electricity generally is fixed on a wall. This kind of lamp does not have an anesthetically pleasing appearance and has only the function of providing emergency illumination in a fixed location. Furthermore, since such a conventional lamp is too heavy to carry, it is inconvenient for a user to use it as a portable light source in the dark.

The present invention has arisen to mitigate and/or obviate the disadvantages of the conventional emergency lamp.

SUMMARY OF THE INVENTION

In accordance with one aspect of the present invention, a lamp in accordance with the present invention includes a base that holds a storage battery and a printed circuit board. A reflector is mounted on the base and has a bulb mounted at the center. The bulb, the storage battery and the print circuit board are connected with wires. A globe is detachably mounted on the base. The lamp can be used as a normal portable lamp and an emergency lighting device when the electricity is interrupted. The lamp further can be used as a flashlight when a handle is mounted on the base of the lamp.

Further benefits and advantages of the present invention will become apparent after a careful reading of the detailed description with appropriate reference to the accompanying drawings.

DETAILED DESCRIPTION OF THE INVENTION

Figure 1:
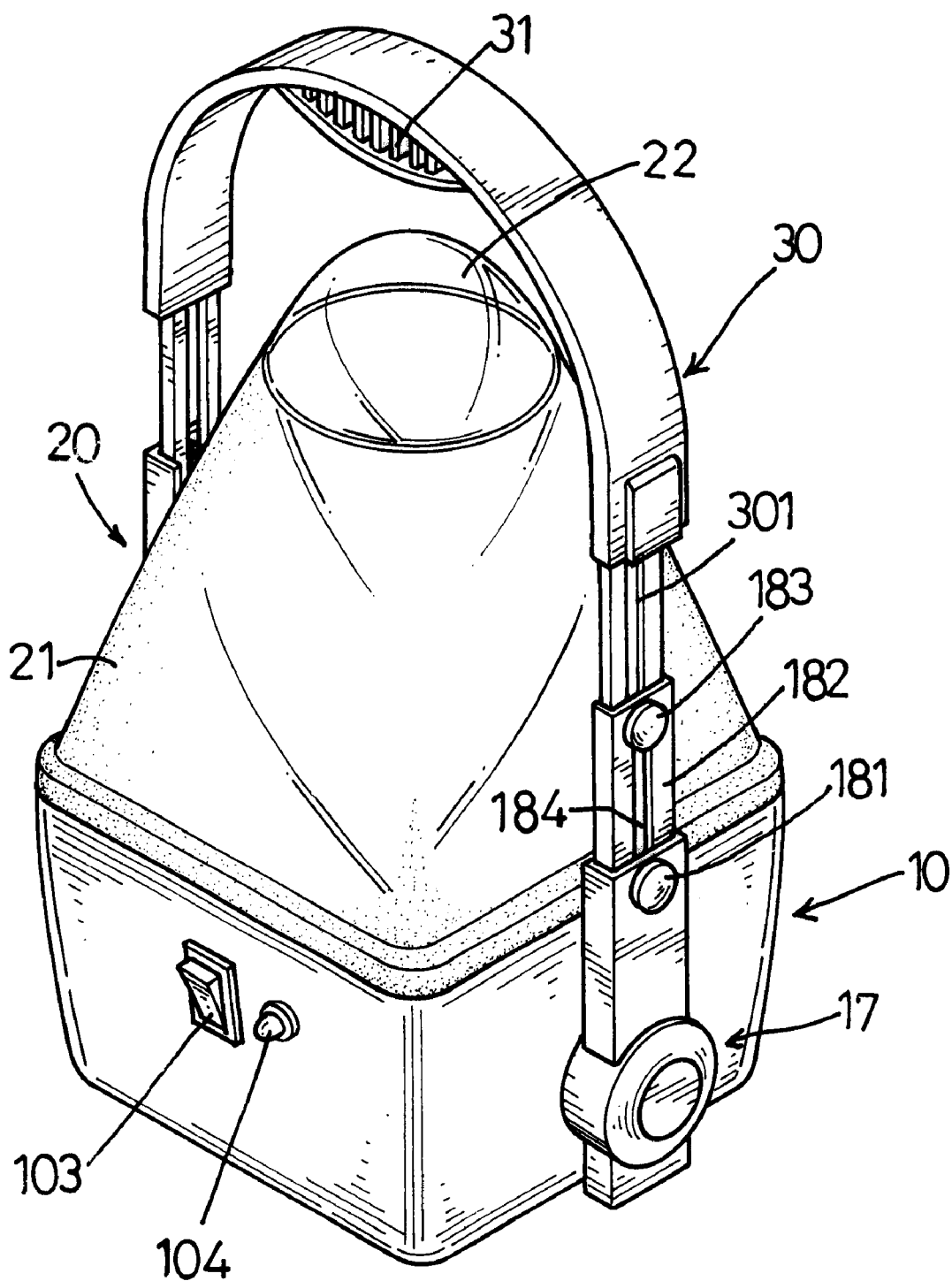
FIG. 1 is a perspective view of a lamp in accordance with the present invention.

Referring to the drawings and initially to FIG. 1, a lamp in accordance with the present invention comprises a base (10), a globe (20) attached to the base (10) and a U-shaped handle (30) pivotally attached to the base (10).

Figure 2:
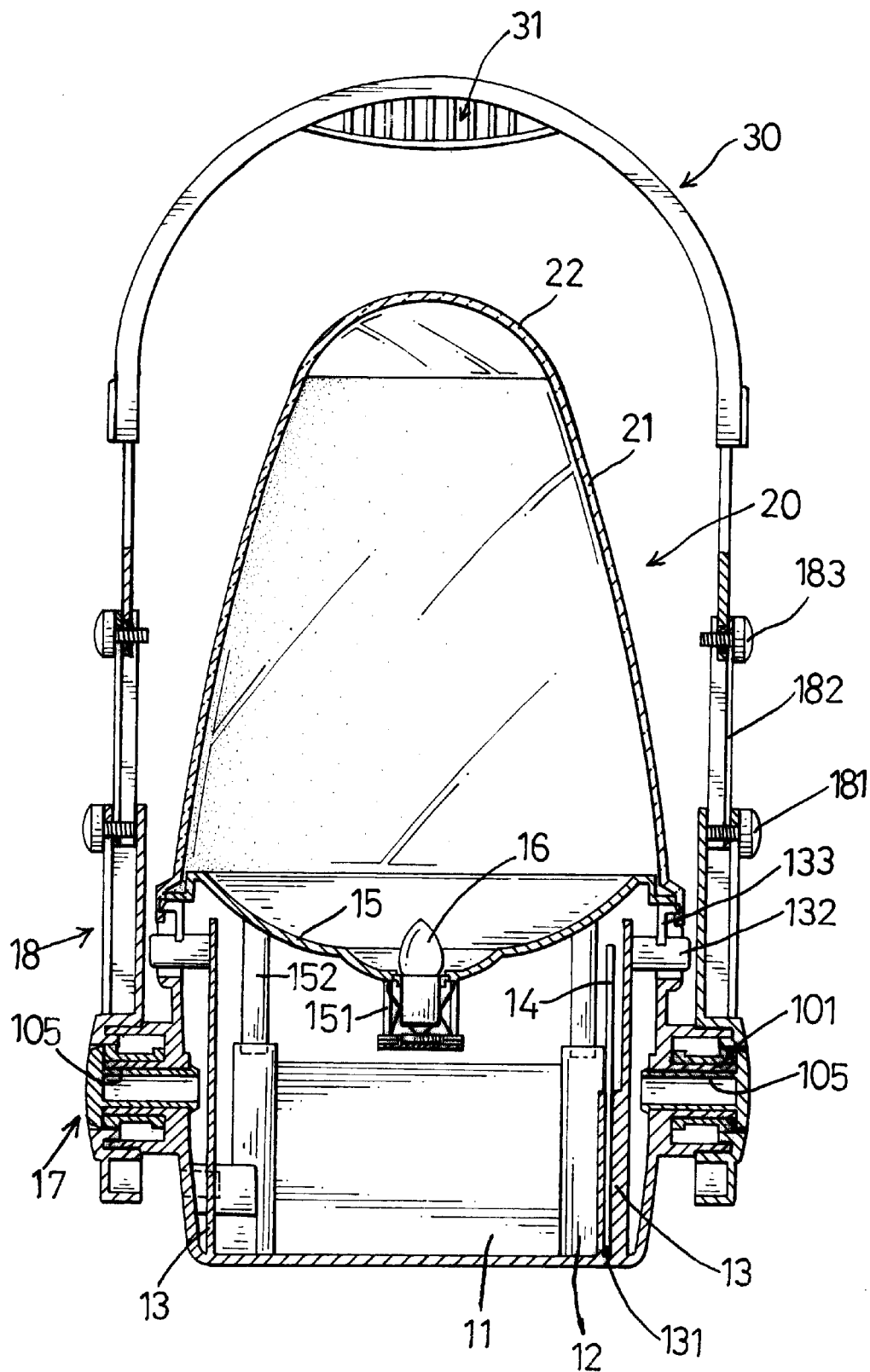
FIG. 2 is a cross-sectional front plan view of the lamp in FIG. 1.

With reference to FIG. 2, the base (10) is bowl-like and has a bottom and wall extending up from the bottom. A storage battery (11) is mounted on the bottom of the base (10) and connected to an external power source by an adapter (not shown) during charging. Multiple hollow supports (12) extend up from the bottom of the base (10) within the wall. Two retaining plates (13) extends up from the bottom of the base (10) within the wall. The retaining plates (13) are on opposite ends of the bottom, and each has a button (132) mounted on the free end of each plate (13). The button (132) extends partially out of the wall of the base (10). An L-shaped hook (133) is attached to each of the buttons (132). The hook (133) has a free end over the wall of the base (10) to clamp the globe (20). A slot (131) is defined in the side of one of the retaining plates (13) toward the storage battery (11). A printed circuit board (14) is inserted into the slot (131) and is electrically connected to the storage battery (11). The printed circuit board (14) includes variety of electric components are soldered on the printed circuit board (14) to give the lamp with the capability of providing an emergency light source.

A light reflector (15) is mounted on the base (10). The light reflector (15) is circular with one side concave and the other convex. Multiple posts (152) extend down from the convex side of the light reflector (15), and each is fastened in a corresponding support (12) in the base (10). A screw (not shown) penetrates the support (12) and is screwed into the post (152) to securely the light reflector (15) in place. A socket (151) is mounted at the center of the light reflector (15)and has a vertical periphery and a bottom each electrically connected to the printed circuit board (14). A bulb (16) is received in the socket (151) and has two contacting points respectively electrically to the vertical periphery and the bottom of the socket (151). The reflector (15) and the bulb (16) are connected to the storage battery (11) by wires. A switch (103) is mounted on the wall of the base (10) to turn on/off the bulb (16). An indicator light (104) is mounted on the wall of the base (10) to show when the lamp is in use.

Figure 3:
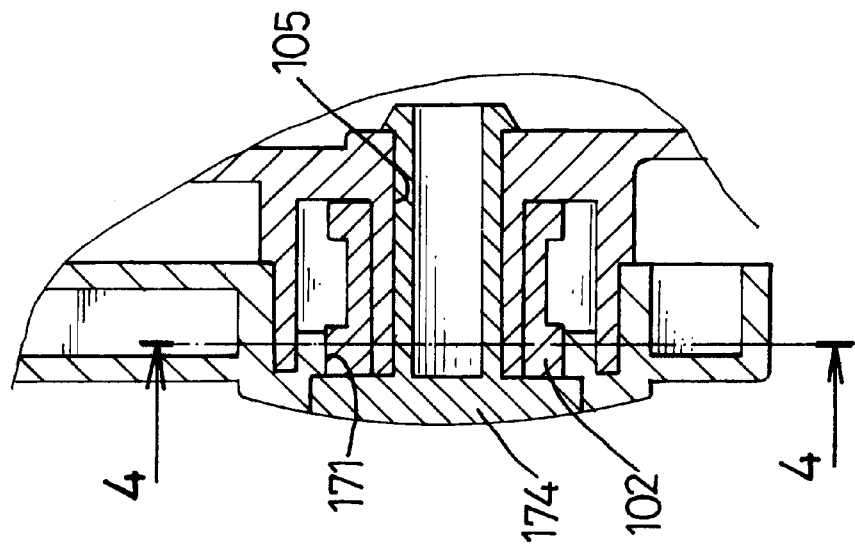
FIG. 3 is an enlarged cross-sectional front plan view of the pivot device in the lamp in FIG. 2
Figure 4:
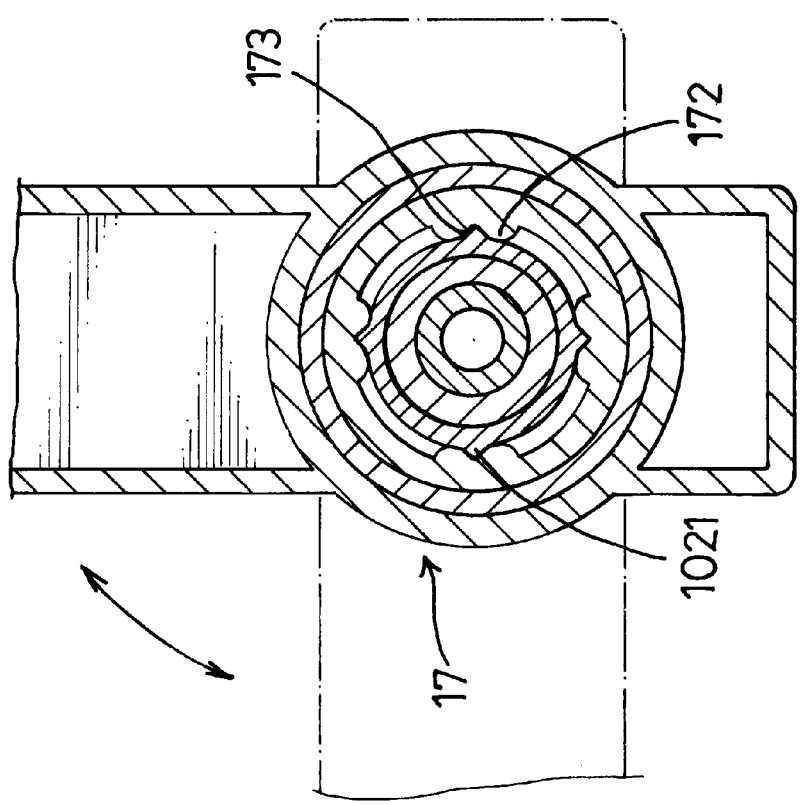
FIG. 4 is an enlarged sectional side plan view of the lamp along the line 4—4 in FIG. 3.
Figure 5:
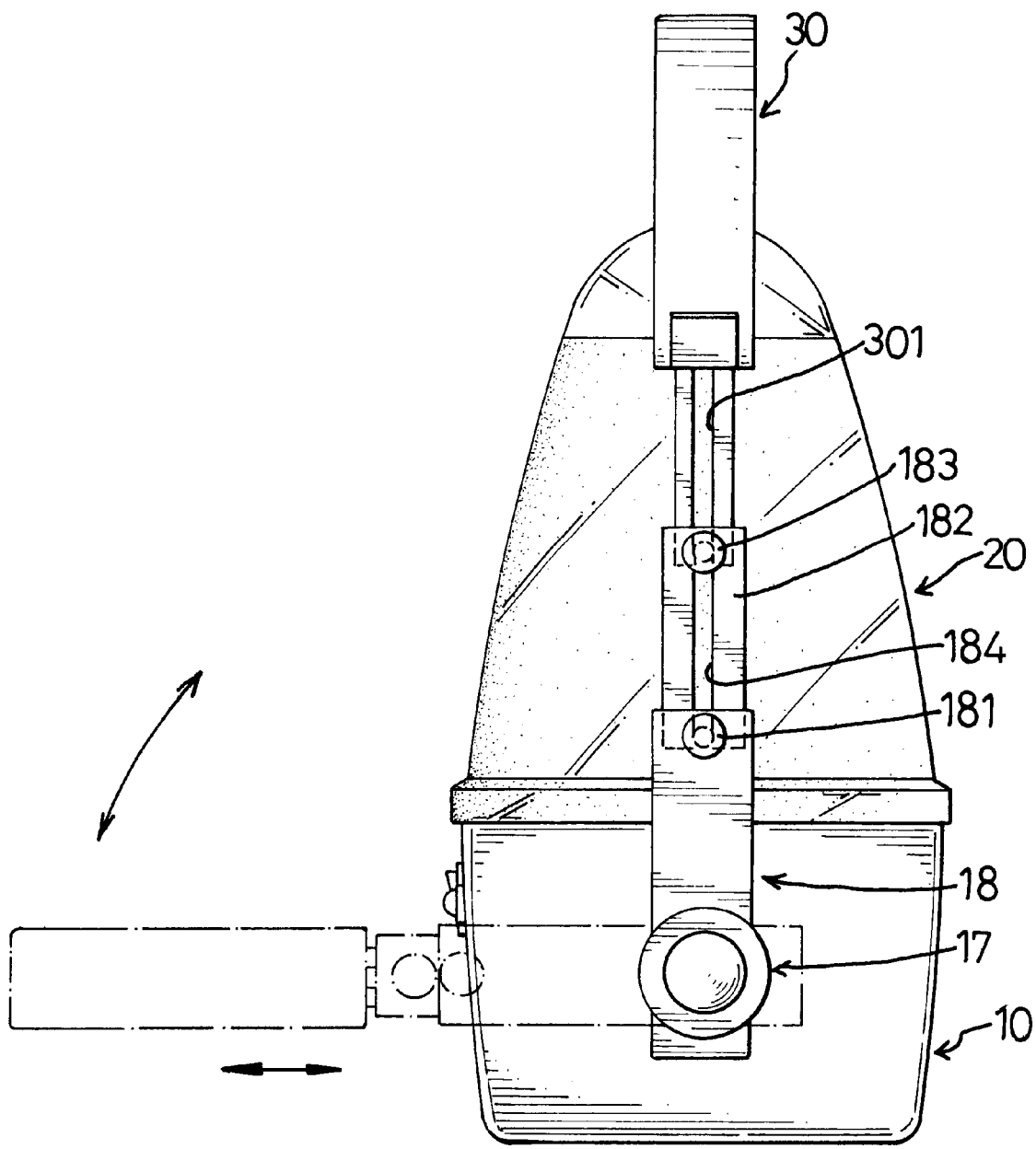
FIG. 5 is an operational side plan view of the lamp in FIG. 1.

With reference to FIGS. 2, 3 and 4, two studs (101) extend from opposite ends of the wall of the base (10). A through hole (106) is defined in each of the studs (101). A sleeve (102) is securely mounted on the stud (101) and has multiple bosses (1021) extending out from a periphery of the sleeve (102). The multiple bosses (1021) equally divide the periphery of the sleeve (102). A pivot device (17) is pivotally mounted on the sleeve (102), and a hole (171) is defined in the pivot device (17) to receive the sleeve (102). A retaining plug (174) is inserted into the through hole (106) of the stud (101) to hold the pivot device in place because the retaining plug (174) has a head (not number) with a diameter which is greater than that of the hole (171) of the pivot device (17). Multiple convex ridge pairs (172) extends from the inside of the hole (171), each corresponding to one of the multiple bosses (1021) of the sleeve (102) and defining a groove (173) to receive the boss (1021) to hold the pivot device (17) at a specific angle. With reference to FIG. 5, with such a configuration, the angle of the handle (30) and the lamp can be changed.

With reference to FIGS. 1 and 2, a connecting device (18) extends from the pivot device (17). The connecting device (18) is a hollow block. A first fastener (181) is mounted in the free end of the connecting device (18). A hollow bar (182) is partially received in the connecting device (18) and has a first groove (184) longitudinally defined in one side to receive the first fastener (181). The bar (182) is held in place by the connecting device (18) and the first fastener (181). The first fastener (181) as shown in FIG. 2 is a bolt. A second fastener (183) is mounted in the other end of the bar (182).

The handle (30) is U-shaped and has two ends. Each of the ends of the handle (30) is received in the bar (182) and has a second groove (301) defined to received the second fastener therein. The handle (30) is held in place in the bar (182) by the second fastener (183). The second fastener (183) as shown in FIG. 2 is a bolt. A non-slip portion (31) is formed at the middle of the handle (30). The distance between the non-slip portion (31) and the lamp can be adjusted by the bar (182). Further, the handle (30) can be detached so the lamp can be used as a desk lamp.

The open end of the globe (20) has an edge corresponding to the wall of the base (10) and abutting the edge of the wall to completely close the open end of the base (10). A translucent portion (21) is formed on the side of the globe (20) to soften the light of the lamp. A transparent portion (22) is formed on the top of the globe (20) to allow all the light to pass through to form a beam.

Although the invention has been explained in relation to its preferred embodiment, it is to be understood that many other possible modifications and variations can be made without departing from the spirit and scope of the invention as hereinafter claimed.

What is claimed is:

1. A lamp comprising:

a bowl-like base (10) having a bottom and a wall extending up from said bottom;

a storage battery (11) mounted on said bottom of said base (10);

two retaining plates (13) each extending up from opposite ends of said bottom of said base (10) within said wall of said base (10); said retaining plate (13) having a free end having a button (132) mounted thereon, said button partially extending through said wall of said base (10);

a hook (133) attached to said button and having a free end over said wall of said base (10);

a printed circuit board (14) mounted in one of said retaining plates (13) and electrically connected to said storage battery (11);

a reflector (15) mounted on said base (10);

a socket (151) mounted at the center of said reflector (15) said socket (151) having a vertical periphery and a bottom each electrically connected to said printed circuit board (14);

a bulb (16) received in said socket (151), said bulb including two contact points respectively, an electrically contact with said vertical periphery and said bottom of said socket; and a globe (20) having an open end, said open end of said globe (20) having an edge corresponding to said wall of said base (10) and abutting an edge of said wall to form a chamber; said globe (20) having a translucent side (21) and a transparent top (22).

2. The lamp as claimed in claim 1, wherein said base (10) includes a switch (103) and an indicator light (104) each mounted on said wall of said base (10).

3. The lamp as claimed in claim 1, wherein one of said retaining plates (13) includes a slot (131) defined in one side thereof facing said storage battery (11) to receive said printed circuit board (14).

4. The lamp as claimed in claim 1, wherein said base (10) includes:

two studs (101) extending from opposite ends of said wall of said base (10), each of said studs (101) having a through hole (106) defined therein;

a sleeve (102) securely mounted on said stud (101) and having multiple bosses (1021) extending out from the side;

a pivot device (17) pivotally mounted on said sleeve (102) and having a hole (171) defined to receive said sleeve (102); and a connecting device (18) extending from said pivot device (17), said connecting device (18) being a hollow bar with an opening defined therein and a free end.

5. The lamp as claimed in claim 1, wherein said base (10) includes multiple hollow supports (12) extending up from said bottom of said base (10) within said wall.

6. The lamp as claimed in claim 1, wherein said globe includes the side forming a translucent portion (21) and a top forming a transparent portion (22).

7. The lamp as claimed in claim 4, wherein said pivot device (17) includes:

a retaining plug (174) inserted into said through hole (106) of said stud (101) to hold said pivot device (17) in place;

multiple convex ridge pairs (172) extending from the inside of said hole (171), each corresponding to one of said multiple boss (1021) of said sleeve (102); and a groove (173) defined in said convex ridge pair (172) to receive said boss (1021) to hold said pivot device (17) in a specific angle.

8. The lamp as claimed in claim 4, wherein said connecting device (18) includes:

a first fastener (181) mounted in said free end of said connecting device (18);

a hollow bar (182) partially received in said connecting device (18) and having a first groove (184) longitudinally defined in one side to receive said first fastener (181), said bar (182) being held in place by said first fastener (181); and a second fastener (183) mounted in the other end of the bar (182).

9. The lamp as claimed in claim 4 further comprising a U-shaped handle (30) having two ends each received in said connecting device (18) and having a second groove (301) defined to received said second fastener (183) therein.

10. The lamp as claimed in claim 5, wherein said reflector (15) is circular and has a convex face with multiple posts (152) extending down therefrom, each fastened in a corresponding support (12) of said base (10).

11. The lamp as claimed in claim 8, wherein said first fastener (181) is a bolt.

12. The lamp as claimed in claim 8, wherein said second fastener (183) is a bolt.

* * * * *